(12) United States Patent
Tsirkin et al.

(10) Patent No.: US 10,735,286 B2
(45) Date of Patent: *Aug. 4, 2020

(54) RECOVERY FROM A NETWORKING BACKEND DISCONNECT

(71) Applicant: Red Hat Israel, Ltd., Ra'anana (IL)

(72) Inventors: Michael Tsirkin, Westford, MA (US); Victor Kaplansky, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,306

(22) Filed: Mar. 29, 2019

(65) Prior Publication Data

US 2019/0230013 A1 Jul. 25, 2019

Related U.S. Application Data

(63) Continuation of application No. 15/363,666, filed on Nov. 29, 2016, now Pat. No. 10,250,473.

(51) Int. Cl.
*G06F 15/173* (2006.01)
*H04L 12/26* (2006.01)
(Continued)

(52) U.S. Cl.
CPC ...... *H04L 43/0811* (2013.01); *H04L 41/0654* (2013.01); *H04L 67/10* (2013.01)

(58) Field of Classification Search
CPC ... H04L 43/0811; H04L 41/0654; H04L 67/10
(Continued)

(56) References Cited

U.S. PATENT DOCUMENTS 7,500,014 B1 * 3/2009 Jacobson ............ H04L 41/0677
709/239
7,620,070 B1 11/2009 Maufer et al.
(Continued)

FOREIGN PATENT DOCUMENTS

WO WO2012048014 A2 4/2012

OTHER PUBLICATIONS

Gmane.comp.networking.dpdk.devel, May 7, 2016 [PATCH 4/6] vhost: workaround state vring base, http://article.gmane.org/gmane.comp.networking.dpdk.devel/38631.
(Continued)

*Primary Examiner* — Philip B Tran
(74) *Attorney, Agent, or Firm* — Haynes and Boone, LLP

(57) ABSTRACT

Methods, systems, and computer program products are included for processing one or more buffers in a networking queue. An example method includes receiving one or more transmit requests or receive requests from a guest running on a virtual machine. The method also includes detecting that a networking backend has stopped processing buffers from a networking queue, each queued buffer corresponding to a transmit request or receive request. The method further includes in response to detecting that the networking backend has stopped processing buffers from the networking queue, flushing one or more buffers stored in the networking queue. A buffer corresponding to a receive request may be flushed by storing a set of dummy packets into the buffer. In contrast, a buffer corresponding to a transmit request may be flushed by discarding the buffer.

20 Claims, 6 Drawing Sheets

(51) Int. Cl.
*H04L 29/08* (2006.01)
*H04L 12/24* (2006.01)

(58) Field of Classification Search
USPC .................................................. 709/224, 223
See application file for complete search history.

(56) References Cited

U.S. PATENT DOCUMENTS

| | | | |
|---|---|---|---|
| 8,510,736 | B2 | 8/2013 | Yamashita |
| 8,700,811 | B2 | 4/2014 | Oshins et al. |
| 9,047,251 | B2 | 6/2015 | Suganthi |
| 9,280,467 | B1 * | 3/2016 | Kanteti ............... G06F 12/0808 |
| 9,507,626 | B1 | 11/2016 | Tsirkin |
| 9,606,959 | B1 * | 3/2017 | Rasor ................ G06F 15/17331 |
| 9,996,468 | B1 * | 6/2018 | Shumsky ............... G06F 12/084 |
| 10,250,473 | B2 * | 4/2019 | Tsirkin .................... H04L 67/10 |
| 2007/0239944 | A1 * | 10/2007 | Rupanagunta ........ G06F 3/0613 711/147 |
| 2008/0189570 | A1 | 8/2008 | Terashima |
| 2009/0089815 | A1 | 4/2009 | Manczak |
| 2011/0010721 | A1 | 1/2011 | Gupta |
| 2011/0107148 | A1 | 5/2011 | Franklin |
| 2012/0033680 | A1 | 2/2012 | Gopinath |
| 2012/0081355 | A1 | 4/2012 | Post |
| 2013/0055245 | A1 | 2/2013 | Tsirkin |
| 2013/0155083 | A1 | 6/2013 | McKenzie et al. |
| 2014/0123138 | A1 | 5/2014 | Lee |
| 2015/0058838 | A1 | 2/2015 | Tsirkin |
| 2015/0207697 | A1 | 7/2015 | Satapathy et al. |
| 2015/0358391 | A1 * | 12/2015 | Moon .................... H04L 67/10 709/224 |
| 2016/0094497 | A1 | 3/2016 | Javed et al. |
| 2017/0041266 | A1 * | 2/2017 | Walkin .................. H04L 67/142 |
| 2018/0113635 | A1 * | 4/2018 | Simionescu ........ G06F 12/0864 |

OTHER PUBLICATIONS

Cormac Hogan, "VSphere Storage Appliance (VSA) Resilience—Network Outage Scenario #1: Back End", Sep. 22, 2011, http://blogs.vmware.com/vsphere/2011/09/vsphere-storage-appliance-vsa-network-outage-scenario-1-back-end.html.

Daniel P. Berrange, "Re: [Libvirt] RFC Decoupling VM NIC Provisioning from VM NIC Connection to Backend Networks", Oct. 31, 2011, https://www.redhat.com/archives/libvir-list/2011-October/msg01453.html.

M. Lasserre, F. Balus, T. Morin, N. Bitar, Y. Rekhter, "Framework for Data Center (DC) Network Virtualization", Oct. 2014, https://tools.ietf.org/html/rfc7365.

\* cited by examiner

RECOVERY FROM A NETWORKING BACKEND DISCONNECT

CROSS REFERENCE TO RELATED APPLICATIONS

This application is a continuation of U.S. patent application Ser. No. 15/363,666 filed Nov. 29, 2016 entitled "Recovery From A Networking Backend Disconnect" which is incorporated by reference in its entirety herein.

FIELD OF DISCLOSURE

The present disclosure generally relates to electrical computers and digital data processing, and more particularly relates to processing network buffers associated with a virtual environment.

BACKGROUND

A virtual machine is software that is executed on hardware to create a virtualization of a physical computer system. Virtual machines may function as self-contained platforms that run their own operating systems and software applications. A host machine may concurrently run one or more virtual machines using software that is referred to as a hypervisor. The hypervisor allocates a certain amount of the host machine's resources, such as the host machine's underlying physical processors and memory devices, to each of the virtual machines. This allocating by the hypervisor allows guests of the virtual machines to transparently access the host machine's resources.

Guest applications, including guest operating systems, may be executed on the allocated resources of each virtual machine. Local or remote clients may access these guest applications to perform computing tasks. In some instances, virtual machines and guest applications may be implemented to provide cloud computing environments.

SUMMARY

An example method of processing one or more buffers in a networking queue includes receiving, by a hypervisor, one or more transmit requests or receive requests from a guest running on a virtual machine. The virtual machine and the hypervisor run on a host machine. The method also includes detecting, by the hypervisor, that a networking backend has stopped processing buffers from a networking queue. Each queued buffer corresponds to a transmit request or receive request. The method further includes in response to detecting that the networking backend has stopped processing buffers stored in the networking queue, flushing, by the hypervisor, one or more buffers stored in the networking queue.

An example system for processing one or more buffers in a networking queue includes a networking module that receives one or more transmit requests or receive requests from a guest running on a virtual machine. The virtual machine and the hypervisor run on a host machine. The system also includes a networking queue including one or more buffers for processing by the networking backend. Each queued buffer corresponds to a transmit request or receive request. The system further includes a recovery module that detects that a networking backend has stopped processing buffers from a networking queue. In response to detecting that the networking backend has stopped processing buffers stored in the networking queue, the recovery module flushes one or more buffers stored in the networking queue.

An example non-transitory machine-readable medium includes a plurality of machine-readable instructions that when executed by one or more processors are adapted to cause the one or more processors to perform a method including: receiving, by a hypervisor, one or more transmit requests or receive requests from a guest running on a virtual machine, the virtual machine and the hypervisor running on a host machine; detecting, by the hypervisor, that a networking backend has stopped processing buffers from a networking queue, each queued buffer corresponding to a transmit request or receive request; and in response to detecting that the networking backend has stopped processing buffers stored in the networking queue, flushing, by the hypervisor, one or more buffers stored in the networking queue.

Figure 1:
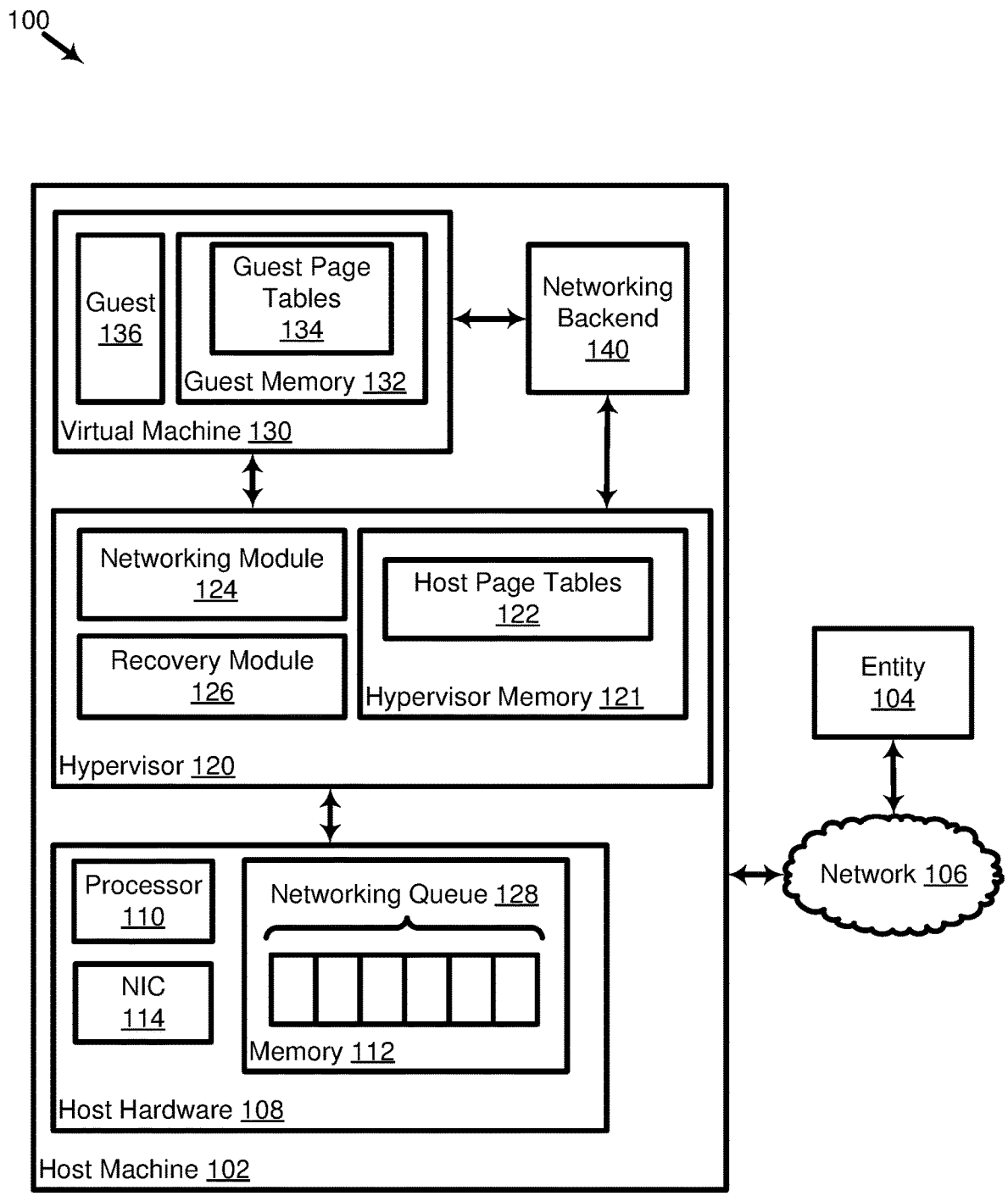
FIG. 1 is an organizational diagram illustrating a system for processing one or more buffers associated with a networking backend, in accordance with various examples of the present disclosure.

Examples of the present disclosure and their advantages are best understood by referring to the detailed description that follows.

I. Overview
II. System Architecture
III. Networking Backend Processes One or More Buffers Stored in the Networking Queue
   A. Insert a Buffer Corresponding to a Receive Request into the Networking Queue
   B. Insert a Buffer Corresponding to a Transmit Request into the Networking Queue
   C. The Networking Backend Processes a Buffer Corresponding to a Request
IV. Recover from the Networking Backend Disconnect
   A. Flush a Buffer Corresponding to a Receive Request
   B. Flush a Buffer Corresponding to a Transmit Request
   C. Index Counter
V. Example Flow Diagrams

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

I. Overview

In a monolithic hypervisor, allocation of all resources is handled by the hypervisor itself, as is control of all hardware access and knowledge of all device drivers that communicate with the physical hardware. Although a monolithic hypervisor may be efficient because it incurs little overhead, a monolithic hypervisor may have some drawbacks. In a monolithic design, the drivers are included as part of the hypervisor, resulting in a dependency on the monolithic hypervisor for the drivers.

This dependency problem may be solved by emulating some devices using a modular approach. For example, a separate hypervisor module (e.g., a process) may be used to process incoming and outgoing packets for a virtual machine and forward them to a network interface card (NIC) on the host machine. Unfortunately, the module may be restarted while the virtual machine is running. Restarting the module may involve disconnecting a networking backend (e.g., closing a socket) and reconnecting a new instance of the hypervisor. A typical guest may use a transmit-and-receive networking queue to exchange packets with the networking backend. On restart of the module, the networking backend determines which packets in the queue have been processed by a previous instance and which have not.

Packets may be stored in a buffer that is inserted into the networking queue. Buffers in the networking queue are typically processed in-order, and each networking queue may be associated with a single index to specify how many packets in the respective networking queue have been processed. Maintaining this single index per networking queue may be advantageous because it reduces the amount of information that is passed to the networking backend and also reduces the chances of a failure. Additionally, the networking backend may determine based on the index how many packets in the networking queue have been processed.

A single index, however, may be insufficient to determine which buffers in the networking queue have been completed and which have not. Processing buffers in parallel means that the buffers may be processed out-of-order. To overcome these problems, a networking backend is typically designed to process buffers serially and may not scale well in multi-core systems.

As further discussed below, these problems may be solved by maintaining an index for each networking queue and incrementing the index after a buffer has been completely processed. This index may be maintained even after detecting that the networking backend is no longer processing buffers stored in the networking queue. In the present disclosure, in response to detecting that the networking backend is no longer processing buffers stored in the networking queue, actions may be performed on the buffers in the networking queue, where the particular actions performed depend on whether the buffer corresponds to a transmit request or a receive request.

In some examples, a system for processing one or more buffers in a networking queue includes a networking module that receives one or more transmit requests or receive requests from a guest running on a virtual machine. The networking queue includes one or more buffers for processing by a networking backend. Each queued buffer corresponds to a transmit request or a receive request. The system may also include a recovery module that detects that the networking backend has stopped processing buffers stored in the networking queue. In response to detecting that the networking backend has stopped processing buffers stored in the networking queue, the recovery module flushes one or more buffers stored in the networking queue. If a buffer corresponds to a receive request, the hypervisor may flush the buffer by storing a set of dummy packets into the buffer. If a buffer corresponds to a transmit request, the hypervisor may flush the buffer by discarding the buffer. A buffer may be discarded by discarding a set of packets stored in the buffer.

These techniques are beneficial and advantageous for reducing the amount of data that is accessed, stored, and/or transmitted to perform a migration of a virtual machine. Various examples described herein provide techniques for processing one or more buffers in a networking queue. It is understood that these features and advantages are shared among the various examples herein and that no one feature or advantage is required for any particular example.

II. System Architecture

FIG. 1 is an organizational diagram illustrating a system 100 for processing one or more buffers associated with a networking backend, in accordance with various examples of the present disclosure.

The system 100 includes a host machine 102. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single source host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The host machine 102 and an entity 104 may be communicatively coupled by a network 106 that communicates data between the host machine 102 and the entity 104. For example, the network 106 may transmit data corresponding to one or more virtual machines from the host machine 102 to the entity 104, or vice versa, using the teachings of the present disclosure. The network 106 may include one or more public and/or private networks, which may each include network devices that transfer data via wired and/or wireless transmission media.

The host machine 102 is structured with host hardware 108. The host hardware 108 includes physical elements such as a processor 110, a memory 112, and network interface card (NIC) 114. In some examples more than one of each of these hardware elements may be included. For example, the host hardware 108 may include a plurality of processors coupled to various types of memory and host devices.

The processor 110 included in the host hardware 108 is structured to include one or more general-purpose processing devices such as a microprocessor, central processing unit, and the like. More particularly, the processor 110 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 110 is structured to include one or more special-purpose processing devices such as an application specific integrated circuit (ASIC), a field programmable gate array (FPGA), a digital signal processor (DSP), network processor, and so forth. The processor 110 executes instructions for performing the operations, steps, and actions discussed herein.

The memory 112 included in the host hardware 108 is structured to include at least one computer-readable storage medium on which is stored one or more sets of instructions (e.g., software) embodying any one or more of the methodologies or functions described herein. The memory 112 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory machine-readable medium that are executable by the processor 110.

The processor 110 and memory 112 may be communicatively coupled via one or more buses (e.g., a PCI bus) and/or integrated into a motherboard of the host machine 102. The host hardware 108 also may include other hardware elements, such as a video display unit (e.g., a liquid crystal display (LCD) monitor), alphanumeric input device (e.g., a keyboard), cursor control device (e.g., a mouse), signal generation device (e.g., a speaker), wireless adapter card, audio/sound card, graphics card, storage adapter, and/or other hardware device.

The host machine 102 is structured to include a hypervisor 120, which may include a virtual machine monitor and/or virtual machine manager. The hypervisor 120 is structured with executable instructions that are stored in the memory 112 and executed by the processor 110 to provide one or more virtual machines. In some examples, the hypervisor 120 is structured to run on top of an operating system (OS) and/or kernel. In other examples, the hypervisor 120 is run directly on host hardware 108 without the use of a separate OS or kernel.

The system 100 includes a virtual machine 130 that is provided by the hypervisor 120. The hypervisor 120 is structured to provide the virtual machine 130 by virtualizing at least a portion of the host hardware 108. The hypervisor 120 may provide the virtual machine 130 by performing a hardware emulation, full virtualization, para-virtualization, and/or OS-level virtualization corresponding to the host machine 102. The hypervisor 120 manages system resources, including providing access of guests (e.g., guest applications such as OSs, kernels, user applications, and so forth) of the virtual machine 130 to the host hardware 108, such as the processor 110 and the memory 112. Although one virtual machine is illustrated as running on the host machine 102, the hypervisor 120 may provide a plurality of virtual machines. Other virtual machines may include components similar to those illustrated with respect to virtual machine 130, such as a guest, guest memory, guest page tables, and so forth.

The virtual machine 130 is structured with a guest memory 132. The guest memory 132 is a memory resource that is provided by the hypervisor 120. The hypervisor 120 is structured to provide the guest memory 132 by allocating a portion of the memory 112 using the host page tables 122. The memory 112 is divided into host-physical memory addresses that are portioned into fixed-length blocks of memory that compose memory pages. The host page tables 122 provide entries corresponding to the memory pages that are included in one or more tables. The host page tables 122 use the entries to map one or more ranges of the host-physical memory addresses into one or more guest-physical address ranges that are assigned to the virtual machine 130 as the guest memory 132.

The guest memory 132 is structured with guest page tables 134 that provide another layer of memory addresses mappings. The guest page tables 134 map one or more ranges of guest-virtual memory addresses to the guest-physical addresses provided by the host page tables 122, which may be stored in hypervisor memory 121. Accordingly, the guest-virtual memory addresses are mapped to guest-physical memory addresses by the guest page tables 134, and the guest-physical memory addresses are mapped to the host-physical memory addresses by the host page tables 122. Thus, memory pages in the guest memory may include one or more guest-virtual memory addresses that map to host-physical memory addresses by way of the guest page tables 134 and the host page tables 122.

The virtual machine 130 includes at least one guest 136, which may include a kernel, OS, and/or other application running on the virtual machine 130. A guest kernel of the virtual machine 130 may provide core computing functionality, such as allocating memory pages of the guest memory 132 to processes and/or threads, communicating input and/or output (I/O) to and from virtual devices, managing a file system, handling interrupts, scheduling and running processes to execute instructions of computing tasks by a virtual processor, providing an interface between devices and software applications, and/or providing other important computing features. A guest OS of the virtual machine 130 may run on top of the kernel to provide additional interfaces and functionality on the virtual machine 130 beyond those offered by the kernel. The guest OS may include, for example, RED HAT ENTERPRISE LINUX, FEDORA, WINDOWS, OS X, IOS, ANDROID, or any other OS. In some examples, the virtual machine 130 may be structured to include a plurality of guest OSs.

The guest 136 (e.g., one or more guest kernels, guest OSs, and/or other applications) running on the virtual machine may access the guest-virtual memory addresses provided by the guest memory 132 to read, write, and/or execute data. The guest-virtual memory addresses are translated to host-physical memory addresses using page table mappings stored in the guest page tables 134 and the host page tables 122. Accordingly, the guest 136 is provided read, write, and/or execute access to data stored in the memory 112. Memory pages may be allocated to store executable instructions that are executed by a process running on the virtual machine. In another example, memory pages may be allocated to store other types of data for guests of the virtual machine, such as media files, databases, program files, and/or any other type of data.

FIG. 1 also includes a networking backend 140 that executes networking requests for the hypervisor 120. The hypervisor 120 includes hypervisor memory 130 storing a networking queue 128 that is accessible by the networking backend 140. The hypervisor 120 and networking backend 140 may share memory storing the networking queue 128. The networking queue 128 includes a set of one or more networking buffers, where each buffer corresponds to a receive request or a transmit request. The hypervisor 120 includes a networking module 124 and a recovery module 126 that process networking requests. Although one networking queue 128 and one networking backend 140 are illustrated in FIG. 1, it should be understood that more than one networking queue and/or more than one networking backend may be used.

In an example, the networking module 124 receives one or more transmit requests or receive requests from the guest 136 running on the virtual machine 130. The virtual machine 130 and the hypervisor 120 run on the host machine 102. The networking queue 128 includes one or more buffers for processing by the networking backend 140. In an example, the networking backend 140 is a software networking device such as a virtual machine (e.g., virtual machine 130) or other software networking device. In another example, the networking backend 140 is a hardware networking device such as a physical network card (e.g., NIC 114) or other hardware networking device.

The networking backend 140 may process buffers from the networking queue 128 for the hypervisor 120, as further discussed below. The networking backend 140, however, may stop processing buffers for a variety of reasons. In an example, the networking backend 140 receives a disconnect request or a disconnect signal indicating to the networking backend 140 to stop processing buffers from the networking queue 128. In another example, the networking backend 140 malfunctions and thus stops processing buffers from the networking queue 128. In response to detecting that the networking backend 140 has stopped processing buffers from the networking queue 128, the recovery module 126 flushes one or more of the queued buffers.

Figure 2:
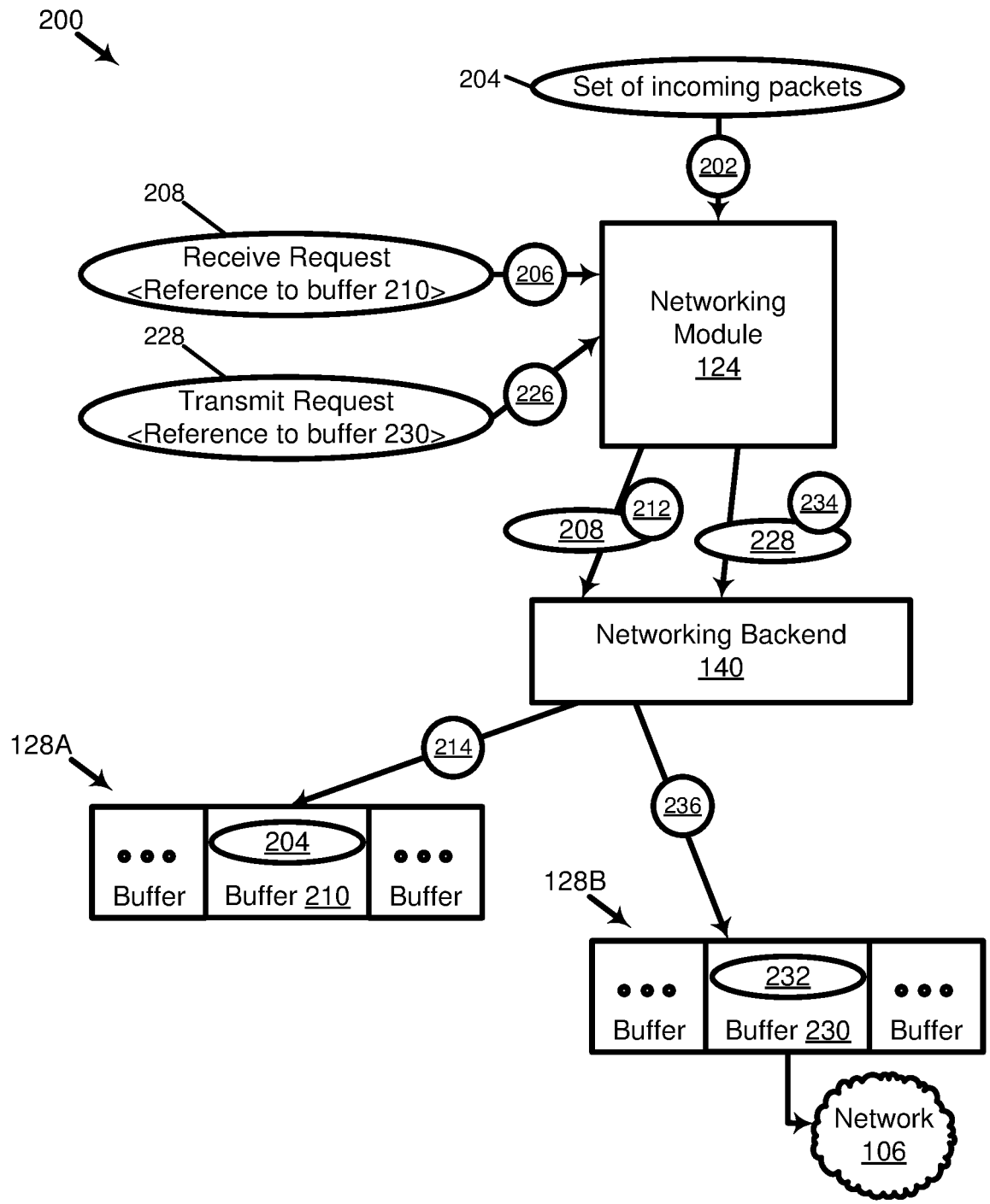
FIG. 2 is an example process flow for processing one or more buffers stored in a networking queue.

III. Networking Backend Processes One or More Buffers Stored in the Networking Queue FIG. 2 is an example process flow 200 for processing one or more buffers stored in the networking queue 128. Process flow 200 is not meant to be limiting and may be used in other applications. The networking module 124 may receive one or more transmit requests or receive requests from the guest 136 running on the virtual machine 130. The networking queue 128 includes one or more buffers for processing by the networking backend 140, where each queued buffer corresponds to a transmit request or a receive request. The networking queue 128 is shared between the networking module 124 and the networking backend 140. The networking backend 140 may process each of the buffers in the networking queue 128.

The networking queue 128 may include one or more queues. In some examples, the networking queue 128 includes a receive-networking queue 128A and a transmit-networking queue 128B. A buffer corresponding to a receive request may be stored in the receive-networking queue 128A, and a buffer corresponding to a transmit request may be stored in the transmit-networking queue 128B. In some examples, the networking queue 128 is a single queue, and buffers corresponding to receive requests and transmit requests are stored in the networking queue 128.

A. Insert a Buffer Corresponding to a Receive Request into the Networking Queue

At action 202, the networking module 124 receives a set of incoming packets 204. In an example, the networking module 124 receives the set of incoming packets 204 over the network 106 from the entity 104. The entity 104 may send the guest 136 data stored in the set of incoming packets 204, and the guest 136 may desire to read this data.

At action 206, the networking module 124 receives a receive request 208 including a reference to a buffer 210 for storing the corresponding set of incoming packets 204. The reference may be a pointer to the buffer 210 or a range of memory addresses at which the buffer 210 is stored. The receive request 208 is a request from the guest 136 to store the set of incoming packets 204 from the network into the memory referenced by the reference in the receive request 208. The guest 136 may read this data stored in the buffer 210 at a later point. The buffer 210 corresponds to the receive request 208 and is located in the guest memory 132 of the guest 136.

In the example illustrated in FIG. 2, at action 212, the networking module 124 forwards the receive request 208 and the set of incoming packets 204 to the networking backend 140, and at action 214, the networking backend 140 stores the set of incoming packets 204 into the buffer 210. This is not intended to be limiting, and in other examples, the networking module 124 does not perform action 212 and stores the set of incoming packets 204 into the buffer 210. The networking module 124 or the networking backend 140 may insert the buffer 210 corresponding to the receive request 208 into a receive-networking queue 128A. It should be understood that the networking module 124 and/or the networking backend 140 may perform one or each of actions 202, 206, 212, and 214 for each receive request 208 received by the networking module 124.

B. Insert a Buffer Corresponding to a Transmit Request into the Networking Queue At action 226, the networking module 124 receives a transmit request 228 including a reference to a buffer 230 storing a set of outgoing packets 232 for transmission over a network. The reference may be a pointer to the buffer 230 or a range of memory addresses at which the buffer 230 is stored. The transmit request 228 is a request from the guest 136 to transmit the set of outgoing packets 232 stored in the memory referenced by the reference in the transmit request 228 to, for example, the entity 104. The guest 136 may store the set of outgoing packets 232 into the buffer 230, which corresponds to the transmit request 228 and is located in the guest memory 132 of the guest 136.

In the example illustrated in FIG. 2, at action 234, the networking module 124 forwards the transmit request 228 to the networking backend 140, and at action 236, the networking backend 140 transmits the set of outgoing packets 232 over the network. The networking module 124 or the networking backend 140 may insert the buffer 230 corresponding to the transmit request 228 into a transmit-networking queue 128B. It should be understood that the networking module 124 and/or the networking backend 140 may perform one or each of actions 226, 234, and 236 for each transmit request 228 received by the networking module 124.

C. The Networking Backend Processes a Buffer Corresponding to a Request

The networking backend 140 processes a buffer stored in the networking queue 128 by executing the request corresponding to the buffer. In the present disclosure, processing a buffer may also refer to processing the request corresponding to the buffer, and vice versa. A buffer may undergo a lifecycle once it is inserted into the networking queue 128. For example, a buffer in the networking queue 128A, 128B may be marked as pending processing by a buffer destination, marked as currently being processed by a buffer destination, or marked as completed.

A buffer destination of a buffer is an entity that consumes the data in the buffer and completes the request corresponding to the buffer. For example, the virtual machine 130, the NIC 114, the networking backend 140, or the hypervisor 120 may be the buffer destination of a buffer. If a buffer is pending processing, a buffer destination has not yet started to process the buffer. A buffer that is inserted into the networking queue may be marked as pending processing.

After the buffer destination has started to process a buffer, the buffer destination may mark the buffer as currently being processed. After the buffer destination has completed processing the buffer, the buffer destination may mark the buffer as completed.

In an example, the networking backend 140 processes the buffer 210 corresponding to the receive request 208 by storing the set of incoming packets 204 into the buffer 210. In this way, the networking backend 140 may assist the hypervisor 120 in processing receive requests such that the guest 136 may read the data stored in the buffer 210 and thus "receive" this data. The networking backend 140 may send the guest 136 an indication that the set of incoming packets 204 has been stored into the buffer 210, and the guest 136 may read this data. After the networking backend 140 has stored the set of incoming packets 204 into the buffer 210, the networking backend 140 may mark the buffer 210 as completed.

In an example, networking backend 140 processes the buffer 230 corresponding to the transmit request 228 by transmitting the set of outgoing packets 232 stored in the buffer 230 over a network (e.g., to the entity 104). In this way, the networking backend 140 may assist the hypervisor 120 in processing transmit requests such that the guest 136's transmit request is completed. The networking backend 140 may send the guest 136 an indication that the set of outgoing packets 232 has been transmitted. After the networking backend 140 transmits the set of outgoing packets 232 over the network, the networking backend 140 may mark the buffer 230 as completed. In some examples, after a buffer destination completes the processing of a buffer corresponding to a transmit request, the buffer destination discards the set of packets stored in the buffer or discards the buffer.

It is understood that additional processes may be performed before, during, or after the actions discussed above. It is also understood that one or more of the actions of process flow 200 described herein may be omitted, combined, or performed in a different sequence as desired.

IV. Recover from the Networking Backend Disconnect

At some later point in time, the networking backend 140 may cease operating and stop processing buffers from the networking queue 128. In an example, the networking backend 140 may be a software networking device that crashes and in order to operate properly, is restarted. During this time, the networking backend 140 may be unavailable for processing buffers. In another example, the networking backend 140 may be a hardware networking device that continues to process buffers from the networking queue 128, but will not process additional buffers. In this example, the networking backend 140 will not process the buffers in the networking queue 128 that are pending processing. It may be desirable to recover from the loss of the networking backend 140 without involving the guest 136. After detecting that the networking backend 140 has stopped processing buffers (e.g., any buffers or those that are pending processing in the networking queue 128) from the networking queue 128, the recovery module 126 may traverse one or more buffers stored in the networking queue 128 and flush one or more of the traversed buffers. In an example, the recovery module 126 traverses each buffer stored in the networking queue 128.

Figure 3:
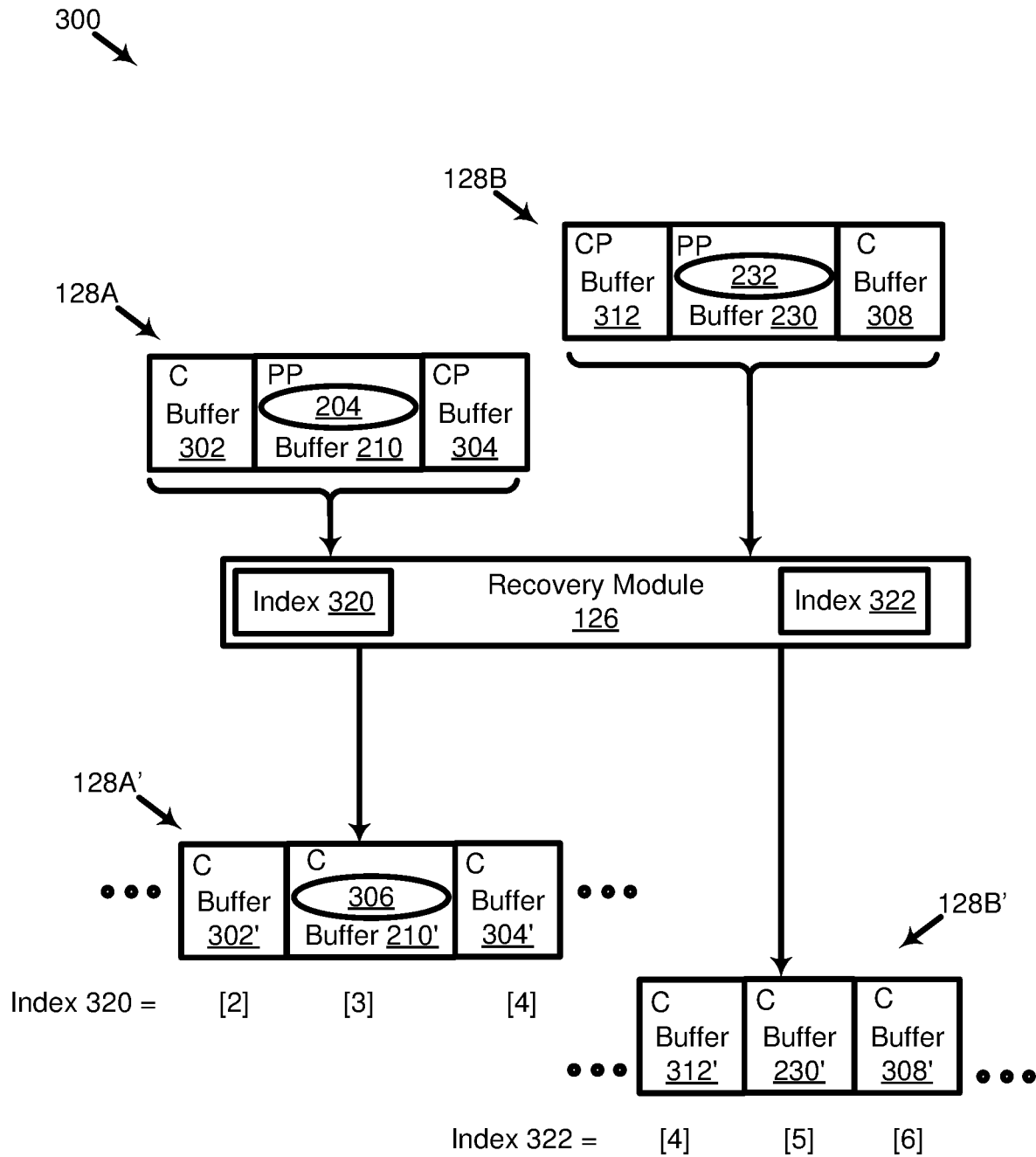
FIG. 3 is an example block diagram for processing one or more buffers after detection that the networking backend has stopped processing buffers in the networking queue.

FIG. 3 is an example block diagram 300 for processing one or more buffers after detection that the networking backend has stopped processing buffers from the networking queue 128. In the present disclosure, after detecting that the networking backend 140 has stopped processing buffers from the networking queue 128, it may be unnecessary for the recovery module 126 to wait until all buffers in the networking queue 128 have been processed. The recovery module 126 may perform an action to flush a buffer depending on whether the traversed buffer corresponds to a receive request or a transmit request and also whether the traversed buffer is pending processing by a buffer destination, currently being processed by a buffer destination, or completed. A buffer destination of a buffer corresponding to a receive request or a transmit request may be, for example, the virtual machine 130, the NIC 114, the networking backend 140, or the hypervisor 120.

A. Flush a Buffer Corresponding to a Receive Request

In FIG. 3, the receive-networking queue 128A includes buffers 302, 210, and 304, each buffer corresponding to a receive request. The buffer 302 has been processed and completed as indicated by the "C" mark, the buffer 210 is pending processing as indicated by the "PP" mark, and the buffer 304 is currently being processed as indicated by the "CP" mark. The recovery module 126 processes the buffers stored in the receive-networking queue 128A to produce the corresponding buffers in the receive-networking queue 128A', which includes the buffers 302', 210', and 304'.

For each traversed buffer 302 corresponding to a receive request and marked as completed, the recovery module 126 may traverse the next buffer in the networking queue 128. In this example, the recovery module 126 may leave this buffer as is. For each traversed buffer 210 corresponding to a receive request and marked as pending processing, the recovery module 126 flushes the buffer by storing a set of dummy packets 306 into the buffer. For example, the recovery module 126 replaces set of incoming packets 204 initially stored in the buffer 210 with the set of dummy packets 306, as shown in the buffer 210' in the receive-networking queue 128A'. If the guest 136 reads the set of dummy packets 306, the guest may know to ignore the set of dummy packets 306. It may be desirable for the set of dummy packets to be in a format or store a special value that the guest has already been configured to ignore. In this way, it may be unnecessary to modify the guest. For example, the set of dummy packets 306 may include a flag indicating to the guest to ignore the dummy packet or have a length of zero.

In some examples, for each traversed buffer 304 corresponding to a receive request and marked as currently being processed, the recovery module 126 may wait for the respective buffer destination to complete processing the buffer. After the buffer destination has completed processing the buffer 304, the buffer destination may mark the buffer 304 as completed, as shown in the buffer 304' in the receive-networking queue 128A'. In an example, if the networking backend 140 is a hardware device (e.g., NIC 114), the NIC 114 may continue to process the buffers that the networking backend 140 has already started to process, but will not process any additional buffers (e.g., those that are pending processing). In some examples, for each traversed buffer 304 corresponding to a receive request and marked as currently being processed, the recovery module 126 may mark the buffer as completed, as shown in the buffer 304'. The recovery module 126 may wait for the buffer destination to actually complete processing the buffer 304 before marking it as complete, or may mark the buffer 304 as completed even if the buffer destination has not completed processing the buffer 304.

B. Flush a Buffer Corresponding to a Transmit Request

In FIG. 3, the transmit-networking queue 128B includes the buffers 312, 230, and 308, each buffer corresponding to a transmit request. The buffer 312 is currently being processed as indicated by the "CP" mark" the buffer 230 is pending processing as indicated by the "PP" mark, and the buffer 308 has been processed and completed as indicated by the "C" mark. The recovery module 126 processes the buffers stored in the transmit-networking queue 128B to produce the corresponding buffers in the transmit-networking queue 128B', which includes the buffers 312', 230', and 308'.

For each traversed buffer 312 corresponding to a transmit request and marked as currently being processed, the recovery module 126 may wait for the respective buffer destination to complete processing the respective buffer. After the buffer destination has completed processing the buffer 312, the buffer destination may mark the buffer 312 as completed, as shown in the buffer 312'. In an example, if the networking backend 140 is a hardware device such as a NIC 114, the NIC 114 may continue to process the buffers that it has already started to process, but will not process any new buffers. In some examples, for each traversed buffer 312 corresponding to a transmit request and marked as currently being processed, the recovery module 126 may mark the respective buffer as completed, as shown in the buffer 312'.

For each traversed buffer 230 corresponding to a transmit request and marked as pending processing, the recovery module 126 flushes the buffer by marking the buffer as completed, as shown in the buffer 230' in the transmit-networking queue 128B'. The recovery module 126 may discard the set of outgoing packets 232 that was stored in the buffer 230 and notify the guest 136 that the transmit request corresponding to the buffer 230 has been completed. Accordingly, the guest 136 may consider the transmit request processed even though the set of outgoing packets 232 was not transmitted. The application may be able to recover from this packet loss. In some examples, the recovery module 126 informs the guest 136 that the way the transmit request was processed was by discarding the set of outgoing packets 232 stored in the buffer 230. As discussed above, in some examples, after a buffer destination completes the processing of a buffer corresponding to a transmit request, the buffer destination discards the set of packets stored in the buffer. If the recovery module 126 discards the set of packets stored in a buffer corresponding to a transmit request 228, any entity that analyzes the buffer may determine that the buffer has already been processed because it does not store any packets. Additionally, a buffer corresponding to a transmit request may be flushed by discarding the buffer. In an example, discarding a buffer may include removing the buffer from the networking queue.

For each traversed buffer 308 corresponding to a transmit request and marked as completed, the recovery module 126 may traverse the next buffer in the networking queue 128. In this example, the recovery module 126 may leave this buffer as-is.

C. Index Counter

If the networking queue 128 is a first-in/first-out (FIFO) queue, the buffers are sequentially processed in the order in which they are stored in the networking queue 128. A networking queue may be associated with an index number that refers to a position in the queue. An index counter may be maintained for a FIFO queue, in which all buffers in the networking queue 128 that are in a position before an index have been processed, and no buffers in the networking queue 128 that are in a position indicated by the index and after the index have been processed. The networking backend 140 may start processing from the position indicated by the index and thus save time and resources because it may be unnecessary for the networking backend 140 to determine where it should start processing buffers from the networking queue 128. Additionally, the index may avoid the networking backend 140 from processing buffers more than once. Accordingly, it may be desirable to keep track of which buffers have completed processing and which have not by maintaining an index counter for the networking queue 128. For a buffer corresponding to a receive request, the request is completed when the set of incoming packets is stored in the appropriate buffer. For a buffer corresponding to a transmit request, the request is completed when the set of outgoing packets has been transmitted over a network.

In FIG. 3, an index 320 may be maintained and refer to a buffer or position in the receive-networking queue 128A', and an index 322 may be maintained and refer to a buffer or position in the receive-networking queue 128B'. Accordingly, if the recovery module 126 detects that the networking backend 140 is ready to process buffers from the networking queue 128, the recovery module 126 may send the index to the networking backend 140, which may then start processing the buffer located at a position in the networking queue 128 as indicated by the index. In this way, the networking backend 140 may start processing buffers starting from the last completed buffer.

In some examples, for each buffer stored in a networking queue 128 that has been marked as completed, the hypervisor 120 maintains and increments the index for the networking queue. In an example, the hypervisor 120 increments the index counter regardless of whether the networking backend 140 has stopped processing buffers. In another example, the hypervisor 120 maintains and increments the index counter after detecting that the networking backend 140 has stopped processing buffers.

In an example, the recovery module 126 traverses the existing buffers in the networking queue 128 and increments the index for each traversed buffer marked as completed, and stops incrementing the index once the recovery module 126 encounters the prior to the last one that has been completed (because the networking backend 140 may still be processing buffers). In this example, after detecting that the networking backend 140 is back up and running, the recovery module 126 may send the index to the networking backend 140, which may start processing the buffer stored at the position in the networking queue 128 as indicated by the index.

After the recovery module 126 has detected that the networking backend 140 is ready to process buffers from the networking queue 128, the recovery module 126 may send the index 320 for the receive-networking queue 128A and the index 322 for the transmit-networking queue 128B to the networking backend 140. In FIG. 3, the index 320 may refer to a position or buffer in the receive-networking queue 128A, and the buffer 302 is stored at a position indicated by index=2, the buffer 210 is stored at a position indicated by index=3, and the buffer 304 is stored at a position indicated by index=4. In an example, index 320 may be "1." In this example, after the buffer preceding the buffer 302 has been processed, the hypervisor 120 may increment the index 320 to "2," after the buffer 302 has been processed, the hypervisor 120 may increment the index 320 to "3," after the buffer 210 has been processed, the hypervisor 120 may increment the index 320 to "4," and so on. In this example, if the networking backend 140 receives the index 320="4," the networking backend 140 may start processing the buffer 304 in the receive-networking queue 128A.

Additionally, the index 322 may refer to a position or buffer in the transmit-networking queue 128B, and the buffer 312 is stored at a position indicated by index=4, the buffer 230 is stored at a position indicated by index=5, and the buffer 308 is stored at a position indicated by index=6. In an example, index 322 may be "3." In this example, after the buffer preceding the buffer 312 has been processed, the hypervisor 120 may increment the index 322 to "4," after the buffer 230 has been processed, the hypervisor 120 may increment the index 322 to "5," after the buffer 308 has been processed, the hypervisor 120 may increment the index 322 to "6," and so on. In this example, if the networking backend 140 receives the index 322="6," the networking backend 140 may start processing the buffer 308 in the transmit-networking queue 128B.

V. Example Flow Diagrams

Figure 4:
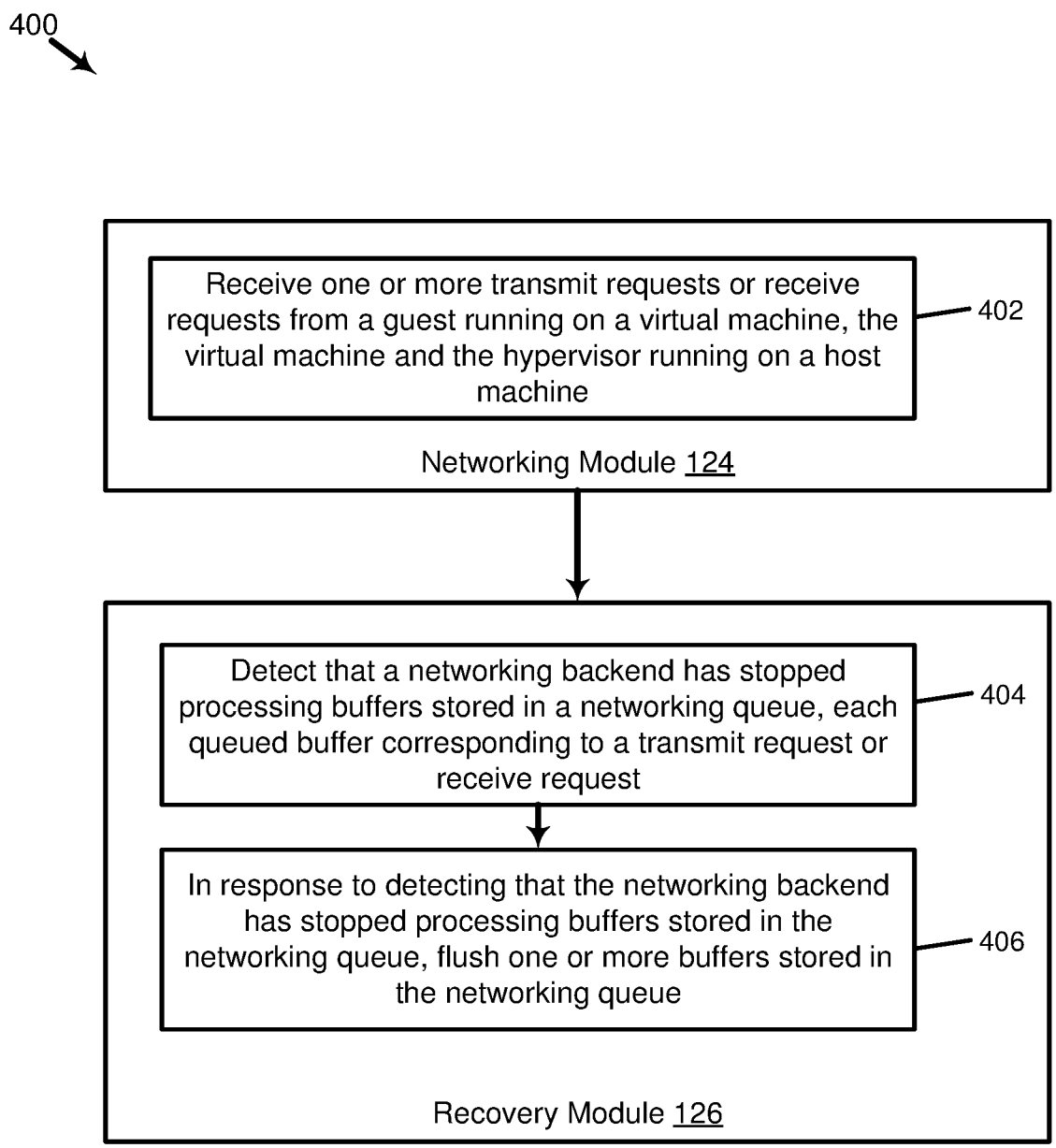
FIG. 4 is a flow diagram illustrating a method for processing one or more buffers in a networking queue, in accordance with various examples of the present disclosure.

FIG. 4 is a flow diagram illustrating a method 400 for processing one or more buffers in the networking queue 128, in accordance with various examples of the present disclosure. The method 400 is not meant to be limiting and may be used in other applications.

At action 402, the networking module 124 receives one or more transmit requests or receive requests from the guest 136 running on the virtual machine 130. The virtual machine 130 and the hypervisor 120 run on the host machine 102. Referring to FIG. 2, to receive data from a network, the guest 136 may send the receive request 208 to the hypervisor 120 through the virtual machine 130, where the receive request 208 includes a reference to the buffer 210 and is a request to store the set of incoming packets 204 into the buffer 210. To transmit data over a network, the guest 136 may store the set of outgoing packets 232 including the data into the buffer 230 and send the transmit request 228 to the hypervisor 120. The transmit request 228 includes a reference to the buffer 230 and is a request to transmit the set of outgoing packets 232 stored in the buffer 230 over a network.

At action 404, the recovery module 126 detects that the networking backend 140 has stopped processing buffers stored in the networking queue 128, each queued buffer corresponding to a transmit request or receive request. At action 406, in response to detecting that the networking backend 140 has stopped processing buffers stored in the networking queue 128, the recovery module 126 flushes one or more buffers stored in the networking queue 128.

It is understood that additional processes may be performed before, during, or after actions 402, 404, and/or 406 discussed above. It is also understood that one or more of the actions of method 400 described herein may be omitted, combined, or performed in a different sequence as desired.

Figure 5:
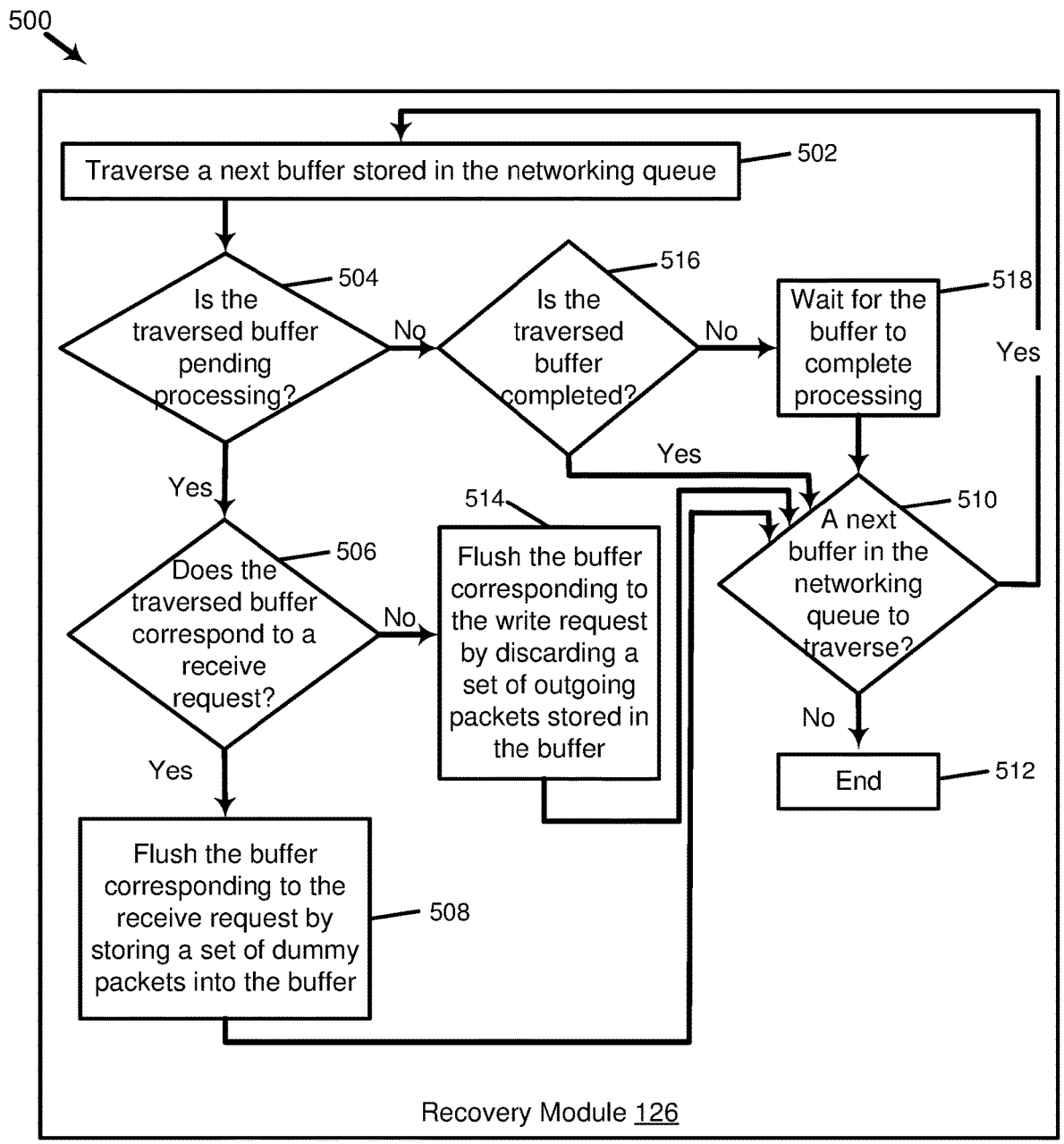
FIG. 5 is a flow diagram illustrating a method for flushing one or more buffers in the networking queue.

FIG. 5 is a flow diagram illustrating a method 500 for flushing one or more buffers stored in the networking queue 128, in accordance with various examples of the present disclosure. The method 500 is not meant to be limiting and may be used in other applications.

At action 502, the recovery module 126 traverses a next buffer stored in the networking queue 128. At action 504, the recovery module 126 determines whether the traversed buffer is pending processing. If the traversed buffer is pending processing, process flow proceeds to action 506, in which the recovery module 126 determines whether the traversed buffer corresponds to a receive request.

If the traversed buffer corresponds to a receive request, process flow proceeds to action 508, in which the recovery module 126 flushes the buffer corresponding to the receive request by storing a set of dummy packets into the buffer. After action 508, process flow proceeds to action 510, in which the recovery module 126 determines whether there is a next buffer in the networking queue 128 to traverse. If the networking queue 128 has another buffer to traverse, process flow proceeds to action 502, in which the recovery module 126 traverses the next buffer stored in the networking queue 128. If the networking queue 128 does not have another buffer to traverse, process flow proceeds to an end 512.

In contrast, if the traversed buffer corresponds to a write request, process flow proceeds to action 514, in which the recovery module 126 flushes the buffer corresponding to the write request by discarding a set of outgoing packets stored in the buffer. After action 514, process flow proceeds to action 510, in which the recovery module 126 determines whether there is a next buffer in the networking queue 128 to traverse. If the networking queue 128 does not have another buffer to traverse, process flow proceeds to an end 512.

Referring back to action 504, if the traversed buffer is not pending processing, process flow proceeds to action 516, in which the recovery module 126 determines whether the traversed buffer is completed. If the traversed buffer is completed, process flow proceeds to action 510. If the traversed buffer is not completed, process flow proceeds to action 518, in which the recovery module 126 waits for the buffer to complete processing. After the recovery module 126 waits for the buffer to complete processing, process flow proceeds to action 510.

It is understood that additional processes may be performed before, during, or after actions 502-518 discussed above. It is also understood that one or more of the actions of method 500 described herein may be omitted, combined, or performed in a different sequence as desired.

Figure 6:
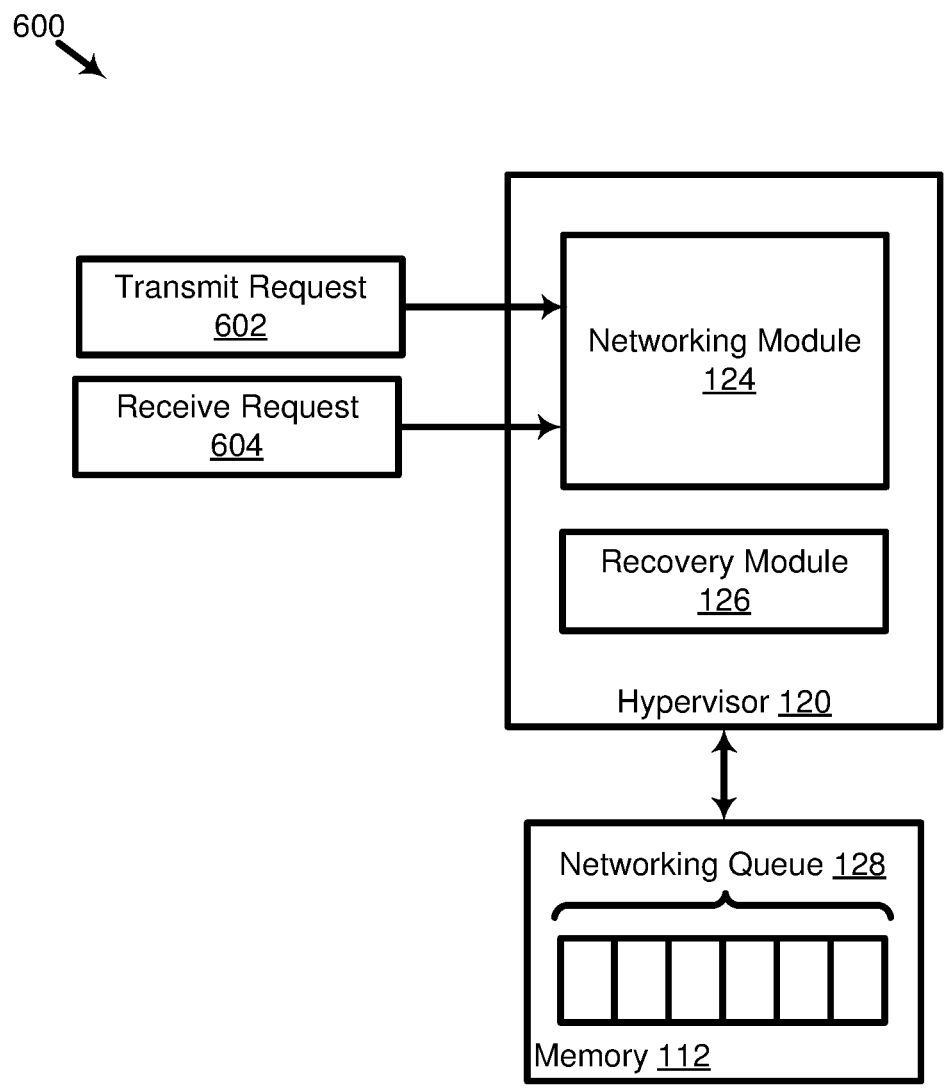
FIG. 6 is an example block diagram for processing one or more buffers associated with a networking backend, in accordance with various examples of the present disclosure.

FIG. 6 is an example block diagram for processing one or more buffers associated with a networking backend, in accordance with various examples of the present disclosure. In FIG. 6, networking module 124 receives one or more transmit requests 602 or receive requests 604. In an example, transmit request 602 and/or receive request 604 is from guest 136 running on virtual machine 130. Additionally, networking queue 128 includes one or more buffers for processing by a networking backend, where each queued buffer corresponds to a transmit request or receive request. In some examples, recovery module 126 detects that the networking backend has stopped processing buffers from networking queue 128. In response to detecting that the networking backend has stopped processing buffers from networking queue 128, recovery module 124 flushes one or more buffers stored in networking queue 128 in accordance with the teachings of the present disclosure.

A computer system is suitable for implementing one or more examples of the present disclosure. In various implementations, the computer system may include a client or a server computing device. The client or server computing device may include a plurality of processors 110. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The example computer system may include a bus or other communication mechanism for communicating information data, signals, and information between various components of the computer system. Additionally, the computer system includes an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (e.g., a keyboard, keypad, mouse, etc.).

A transceiver or network interface transmits and receives signals between the computer system and other devices via a communications link to a network. In an example, the transmission is wireless, although other transmission mediums and methods may also be suitable. The processor 110, which may be a micro-controller, digital signal processor (DSP), or other processing component, processes these various signals, such as for display on the computer system or transmission to other devices via a communications link. The processor 110 may also control transmission of information, such as cookies or IP addresses, to other devices.

Components of the computer system also include a system memory component (e.g., RAM), a static storage component (e.g., ROM), and/or a computer readable medium (e.g., disk drive). The system memory component may include the memory 112. The computer system performs specific operations by the processor 110 and other components by executing one or more sequences of instructions contained in the system memory component. Logic may be encoded in a computer readable medium, which may refer to any medium that participates in providing instructions to the processor 110 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., process flow 200, method flow 400, and/or method flow 500) to practice the present disclosure may be performed by the computer system. In various other examples, a plurality of the computer systems coupled by a communication links to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps, blocks, or actions described herein may be changed, combined into composite steps, blocks, or composite actions, and/or separated into sub-steps, sub-blocks, or sub-actions to provide features described herein.

In the foregoing description, numerous details are set forth. It will be apparent, however, to one of ordinary skill in the art having the benefit of this disclosure, that the present disclosure may be practiced without these specific details. In some examples, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the disclosure should be limited only by the following claims, and it is appropriate that the claims be construed broadly and in a manner consistent with the scope of the examples disclosed herein.

What is claimed is:

1. A method of processing one or more buffers, comprising:
    detecting, by a hypervisor, that a networking backend has stopped processing buffers from a queue, each buffer in the queue corresponding to a request from a guest running on a virtual machine; and
    in response to detecting that the networking backend has stopped processing buffers from the queue, flushing, by the hypervisor, a first buffer stored in the queue, the first buffer storing a set of packets.

2. The method of claim 1, further comprising:
    determining, by the hypervisor, that the first buffer is pending processing.

3. The method of claim 2, further comprising:
    determining that the first buffer corresponds to a read request from the guest to read the set of packets.

4. The method of claim 3, wherein in response to a determination that the first buffer corresponds to the read request, the flushing includes replacing the set of packets with a set of dummy packets in the first buffer.

5. The method of claim 2, further comprising:
    marking, by the hypervisor, the first buffer as completed before a buffer destination has completed processing the first buffer.

6. The method of claim 2, further comprising:
    determining that the first buffer corresponds to a transmit request from the guest to transmit the set of packets.

7. The method of claim 6, wherein in response to a determination that the first buffer corresponds to the transmit request, the flushing includes discarding the set of packets.

8. The method of claim 7, further comprising:
after discarding the set of packets, sending, by the hypervisor, a notification to the guest that the set of packets has been transmitted.

9. A system for processing one or more buffers, comprising:
a hypervisor that detects, by a processor, that a networking backend has stopped processing buffers from a queue, wherein each buffer in the queue corresponds to a request from a guest running on a virtual machine, and
wherein in response to detecting that the networking backend has stopped processing buffers from the queue, the hypervisor flushes a first buffer stored in the queue, wherein the first buffer stores a set of packets.

10. The system of claim 9, wherein the networking backend is the virtual machine.

11. The system of claim 9, wherein the networking backend is a physical network card.

12. The system of claim 9, wherein the queue includes one or more buffers for processing by the networking backend, and each queued buffer corresponds to a read request or a transmit request from the guest.

13. The system of claim 9, wherein the hypervisor determines that the first buffer is pending processing.

14. The system of claim 13, wherein the first buffer corresponds to a transmit request from the guest to transmit the set of packets, and wherein in response to a determination that the first buffer corresponds to the transmit request, the hypervisor flushes the first buffer by discarding the set of packets.

15. The system of claim 13, wherein the first buffer corresponds to a read request from the guest to read the set of packets, and wherein in response to a determination that the first buffer corresponds to the read request, the hypervisor flushes the first buffer by replacing the set of packets with a set of dummy packets in the first buffer.

16. The system of claim 15, wherein the set of dummy packets is in a format that the guest has been configured to ignore.

17. The system of claim 15, wherein the set of dummy packets stores a value that the guest has been configured to ignore.

18. A non-transitory machine-readable medium comprising a plurality of machine-readable instructions that when executed by one or more processors is adapted to cause the one or more processors to perform a method comprising:
detecting, by a hypervisor, that a networking backend has stopped processing buffers from a queue, each buffer in the queue corresponding to a request from a guest running on a virtual machine; and
in response to detecting that the networking backend has stopped processing buffers from the queue, flushing, by the hypervisor, a first buffer stored in the queue, the first buffer storing a set of packets.

19. The machine-readable medium of claim 18, further comprising:
determining that the first buffer corresponds to a read request from the guest to read the set of packets, wherein in response to a determination that the first buffer corresponds to the read request, the flushing includes replacing the set of packets with a set of dummy packets in the first buffer.

20. The machine-readable medium of claim 18, further comprising:
determining that the first buffer corresponds to a transmit request from the guest to transmit the set of packets, wherein in response to a determination that the first buffer corresponds to the transmit request, the flushing includes discarding the set of packets.

* * * * *